United States Patent

Booth et al.

[11] Patent Number: 6,129,194
[45] Date of Patent: Oct. 10, 2000

[54] ELECTROMAGNETIC COUPLING ARMATURE ASSEMBLY WITH COUNTERWEIGHT

[75] Inventors: Dwight E. Booth, Milton, Wis.; Brian A. Taylor, Tipton, Ind.; Mark E. Blakeman, Beloit, Wis.

[73] Assignee: Warner Electric Technology, Inc., Richmond, Va.

[21] Appl. No.: 09/133,273

[22] Filed: Aug. 13, 1998

[51] Int. Cl.[7] .................................................. F16D 27/112
[52] U.S. Cl. ................ 192/84.941; 192/200; 192/84.961
[58] Field of Search ............................ 192/84.961, 84.96, 192/84.941, 84.94, 84.91, 84.95, 84.951, 110 R, 200; 310/51, 92, 100, 103

[56] References Cited

U.S. PATENT DOCUMENTS

| | | | |
|---|---|---|---|
| 4,493,407 | 1/1985 | Newton | 192/84.941 |
| 4,757,888 | 7/1988 | Nakajima | 192/84.961 |
| 5,036,964 | 8/1991 | Booth et al. | 192/84.941 X |
| 5,119,915 | 6/1992 | Nelson | 192/84.94 X |
| 5,134,893 | 8/1992 | Hukki et al. | 74/61 |
| 5,150,779 | 9/1992 | Booth | 192/84.941 X |
| 5,195,625 | 3/1993 | Chang et al. | 192/84.941 |
| 5,366,360 | 11/1994 | Bookbinder et al. | 418/55.5 |
| 5,370,209 | 12/1994 | VanLaningham et al. | 192/200 |
| 5,372,228 | 12/1994 | VanLaningham et al. | 192/84.941 |
| 5,667,050 | 9/1997 | Hasegawa | 192/84.961 |
| 5,751,202 | 5/1998 | Seino | 335/296 |

*Primary Examiner*—Charles A Marmor
*Assistant Examiner*—Ankur Parekh
*Attorney, Agent, or Firm*—Dykema Gossett PLLC

[57] ABSTRACT

An armature assembly for a selectively engageable and disengageable electromagnetic coupling is provided. The armature assembly includes a hub having a central axis that is disposed radially outwardly, and mounted for rotation with, a shaft used to drive an air-conditioning compressor. The assembly also includes a resiliently flexible spider disposed radially outwardly of the hub. The spider is fixed against rotation relative to the hub, but is able to flex axially relative to the hub at a hinge. The armature assembly further includes an annular armature disc disposed radially outwardly of the hub and connected to a first side of the spider. Finally, the armature assembly includes a counterweight disposed on a second side of the spider. The counterweight may be integral with the spider or connected to the hub. An armature assembly in accordance with the present invention balances the dynamic loads present in the electromagnetic coupling without substantially affecting the living hinge of the resiliently flexible spider. The armature assembly is also able to retain the armature disc in the event of a failure of the spider.

13 Claims, 3 Drawing Sheets

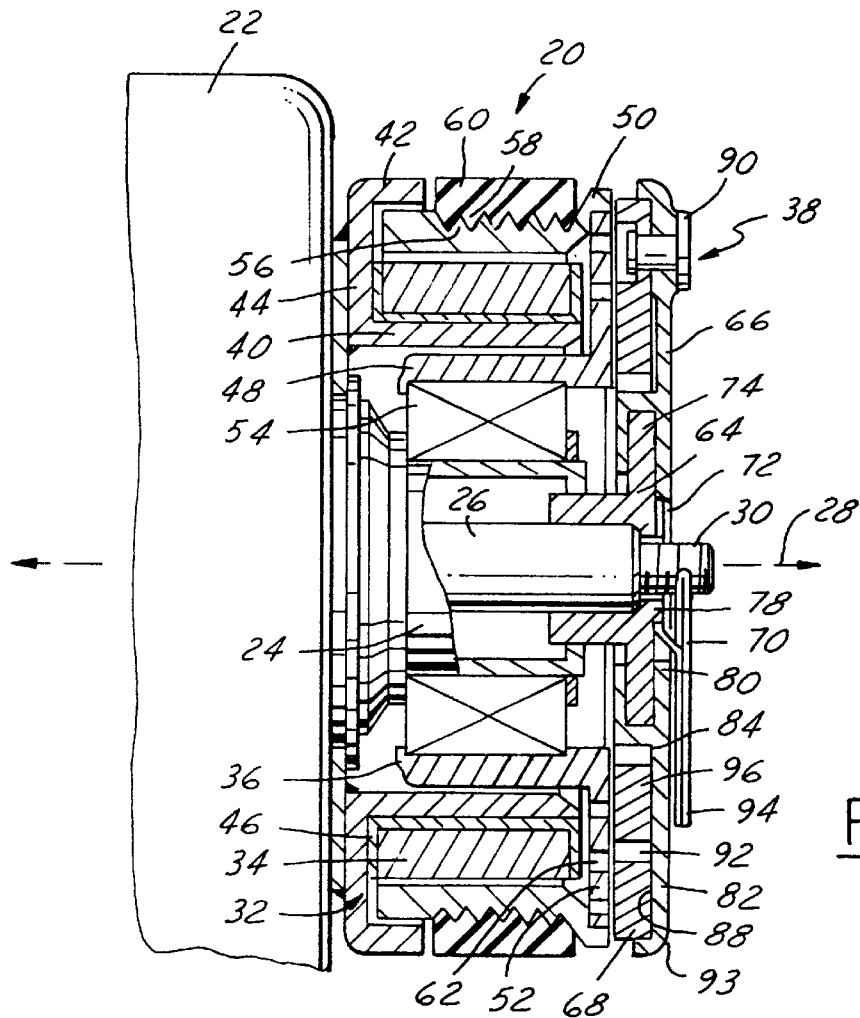
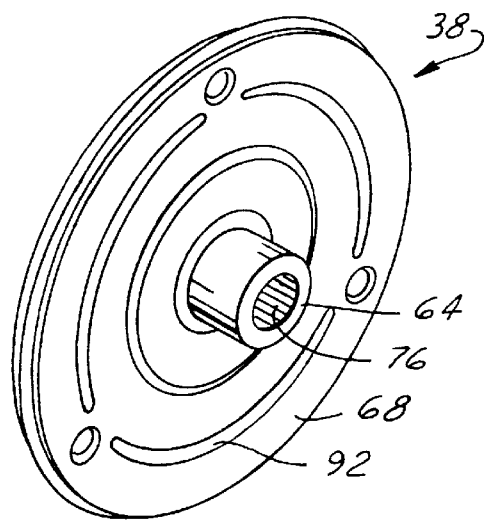
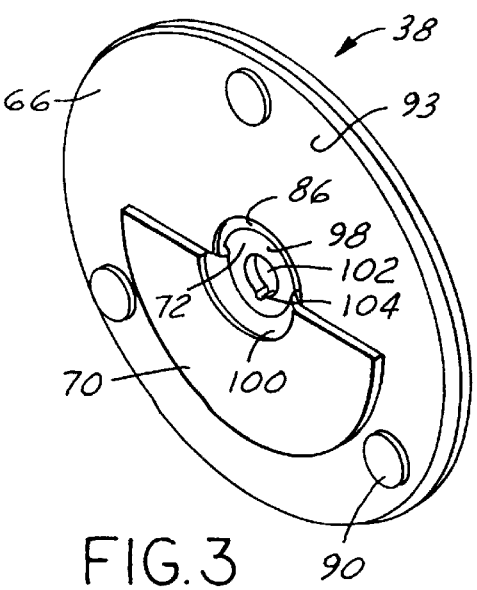
FIG.1
FIG.2
FIG.3

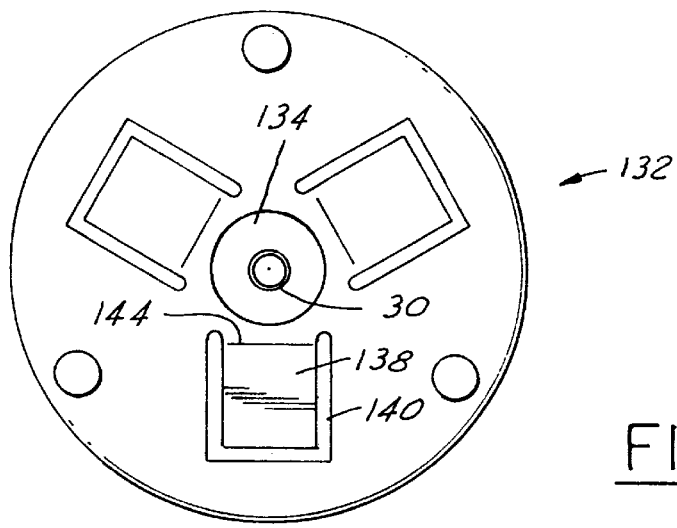
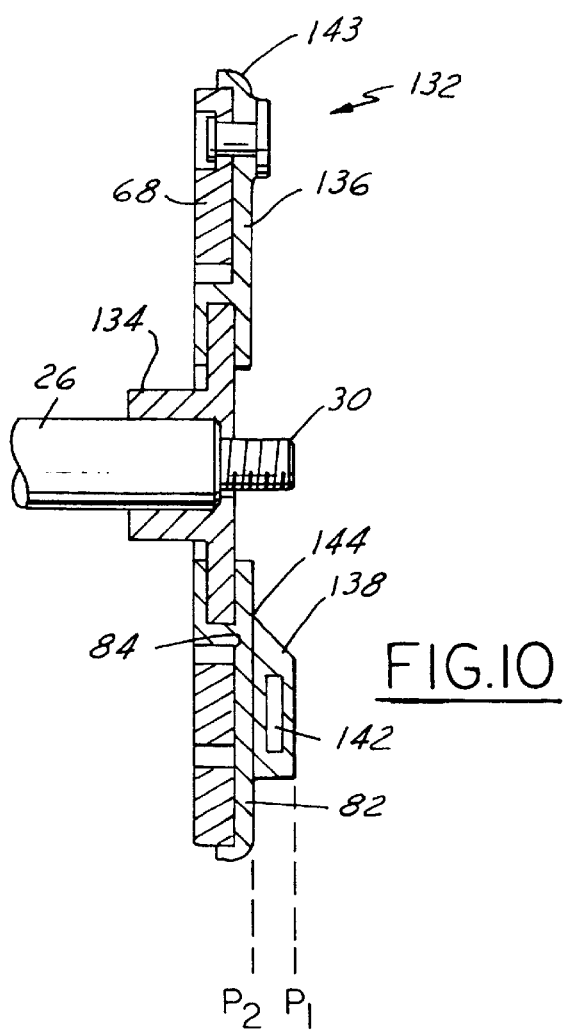
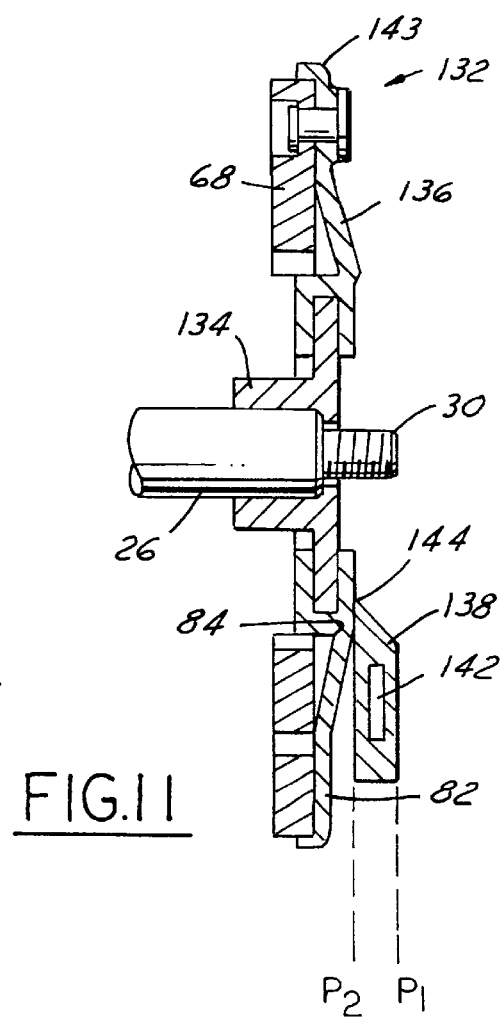

ELECTROMAGNETIC COUPLING ARMATURE ASSEMBLY WITH COUNTERWEIGHT

BACKGROUND OF THE INVENTION

1. Field of the Invention

This invention relates to an armature assembly for a selectively engageable and disengageable electromagnetic coupling such as an electromagnetic clutch or brake and, in particular, to an armature assembly incorporating a counterweight for use in balancing dynamic forces generated within the coupling by a load on which the electromagnetic coupling acts.

2. Disclosure of Related Art

One conventional electromagnetic coupling for use as an electromagnetic clutch includes an armature assembly that is adapted to selectively engage a driving rotor in order to drive a load. The armature assembly includes an armature disc connected to a driven hub by a mounting plate. The armature disc is connected to the mounting plate by a plurality of leaf springs that couple the armature disc to the mounting plate for rotation in unison while allowing the armature disc to move toward and away from the driving rotor when the electromagnetic coupling is energized and deenergized.

It has been found that the above-described coupling is subject to relatively high levels of torsional vibration and acoustic noise. In order to overcome this problem, an armature assembly was developed in which the armature disc is connected to the driven hub using a resiliently flexible plastic spider. One example of such an armature assembly is set forth in U.S. Pat. No. 5,036,964, the entire disclosure of which is hereby incorporated by reference. In the disclosed armature assembly, the spider is molded integrally with the driven hub and extends radially therefrom. The armature disc is connected to the spider at a radially outer part of the spider. Upon energization of the coupling, the spider flexes at a living hinge proximate the hub to allow the armature disc to move into and out of engagement with a driving rotor. The use of the plastic spider dampens much of the torsional vibration and acoustic noise.

The addition of a resiliently flexible spider improved upon the prior art, but also posed several problems. First, it is common to add a counterweight in many electromagnetic couplings to balance out the force exerted on the components of the coupling by the load attached thereto. In an armature assembly incorporating a flexible spider, however, the addition of a counterweight can affect the spider's living hinge. Second, the spider may fail under certain operating conditions and thereby release the armature disc.

There is thus a need for an armature assembly for an electromagnetic coupling that will minimize or eliminate one or more of the above-mentioned deficiencies.

SUMMARY OF THE INVENTION

The present invention provides an armature assembly for a selectively engageable and disengageable electromagnetic coupling.

An object of the present invention is to provide an armature assembly for a selectively engageable and disengageable electromagnetic coupling that includes a resiliently flexible spider, but also includes a counterweight for balancing the dynamic forces generated by the load on which the electromagnetic coupling acts.

Another object of the present invention is to provide an armature assembly for a selectively engageable and disengageable electromagnetic coupling that includes an resiliently flexible spider, but is able to retain the armature disc in the event the spider fails.

An armature assembly for a selectively engageable and disengageable electromagnetic coupling in accordance with the present invention includes a hub having a central axis. The hub may be disposed radially outwardly of, and mounted for rotation with, a shaft used to drive a load. The assembly also includes a resiliently flexible spider disposed radially outwardly of the hub. The spider is fixed against rotation relative to the hub, but is able to flex axially relative to the hub at a hinge. The armature assembly further includes an annular armature disc disposed radially outwardly of the hub and connected to a first side of the spider. Finally, the armature assembly includes a counterweight disposed on a second side of the spider. In one embodiment of the present invention, the counterweight is connected to the hub of the armature assembly using a connector that is integral with the counterweight and that includes an aperture configured to receive a locating pin extending from the hub. In a second embodiment of the present invention, the counterweight is formed from a resiliently flexible plastic and is integral with the spider. The spider includes a U-shaped slot disposed about the counterweight that allows the counterweight to move independently of the spider.

An armature assembly in accordance with the present invention incorporates a counterweight for balancing the dynamic forces present in the electromagnetic coupling without substantially affecting the living hinge of the resiliently flexible spider. In the first embodiment described hereinabove, the counterweight is affixed to the hub of the armature assembly and is completely independent of the spider. In the second embodiment described hereinabove, the counterweight is connected to the spider, but the spider remains able to move independently of the counterweight. An armature assembly in accordance with the first embodiment is also able to retain the armature disc in the event of a failure of the spider. A radially outer portion of the counterweight is axially aligned with a radially inner portion of the armature disc such that axial movement of the armature disc is limited in the event the spider fails.

The present invention also provides a method for adding a counterweight to a selectively engageable and disengageable electromagnetic coupling. The method includes the step of providing a counterweight and a connector connected to the counterweight, the connector having an aperture extending therethrough. The method also includes the step of folding the counterweight such that a first portion of the counterweight is axially adjacent a second portion of the counterweight. Finally, the method includes the step of inserting one end of a shaft that extends through the electromagnetic coupling through the aperture in the connector.

These and other features and objects of this invention will become apparent to one skilled in the art from the following detailed description and the accompanying drawings illustrating features of this invention by way of example.

BRIEF DESCRIPTION OF THE DRAWINGS

FIG. 1 is a cross-sectional view of an electromagnetic coupling incorporating an armature assembly in accordance with a first embodiment of the present invention.

FIGS. 2 and 3 are perspective views of an armature assembly in accordance with a first embodiment of the present invention.

FIG. 9 is a plan view of an armature assembly in accordance with a fourth embodiment of the present invention.

FIGS. 10–11 are cross-sectional view of the armature assembly of FIG. 9 illustrating axial movement of the components of the armature assembly responsive to engagement and disengagement of an electromagnetic coupling.

DETAILED DESCRIPTION OF THE PREFERRED EMBODIMENT

Figure 4:
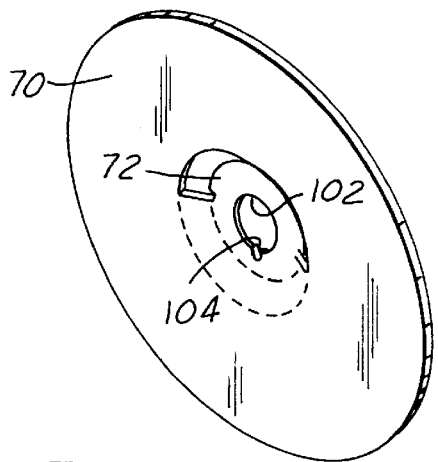
FIGS. 4–6 illustrate several steps in a method of adding a counterweight to an electromagnetic coupling in accordance with the present invention.

Referring now to the drawings wherein like reference numerals are used to identify identical components in the various views, FIG. 1 illustrates an electromagnetic coupling 20 adapted for use with an air conditioning compressor 22. It should be understood by those in the art, however, that coupling 20 may be adapted for use in a wide variety of applications including, but not limited to, an automotive supercharger. Compressor 22 itself may be used in a variety of conventional applications including vehicular applications. Compressor 22 may include a tubular extension 24 on which coupling 20 is mounted and in which a rotatable drive shaft 26 is disposed. Shaft 26 may be centered about an axis 28 and a threaded shank 30 may extend axially from one end of shaft 26.

Coupling 20 may be provided to impart rotation to—or to prevent rotation of—shaft 26 of compressor 22. In the illustrated embodiment coupling 20 is used as a clutch to selectively transmit torque to shaft 26. It should be understood, however, that coupling 20 could also be used as a brake. Coupling 20 may include a magnet core 32, a coil 34, a rotor 36, and an armature assembly 38 in accordance with a first embodiment of the present invention.

Magnet core 32 is provided to house coil 34 and forms part of a magnetic circuit used to draw armature assembly 38 into and out of engagement with rotor 36. Core 32 is conventional in the art and may be made from a material having a relatively low magnetic reluctance. Core 32 is annular and is substantially J-shaped in radial cross-section. Core 32 includes axially-extending inner and outer pole rings 40, 42 and a radially extending bridge 44 that connects pole rings 40, 42. Bridge 44 may be ridgly mounted to compressor 22.

Coil 34 is provided to selectively energize and deenergize coupling 20 and to thereby draw armature assembly 38 into and out of engagement with rotor 36. Coil 34 is conventional in the art and may be disposed within an annular U-shaped channel 46 that is connected to a radially outer side of pole ring 40. Excitation of coil 34 creates a magnetic circuit among magnet core 32, rotor 36, and armature assembly 38 whereby armature assembly 38 is drawn into frictional engagement with rotor 36.

Rotor 36 is provided to frictionally engage armature assembly 38 in order to impart rotation to drive shaft 26 of compressor 22. Rotor 36 is conventional in the art and may be made from a material having a relatively low magnetic reluctance such as steel. Rotor 36 may be substantially U-shaped in radial cross-section, including inner and outer annular pole pieces 48, 50 and a friction face 52 extending therebetween. Inner pole piece 48 of rotor 36 may be rotatably supported on the outer race of a bearing 54 and may be disposed radially inwardly of pole ring 40 of magnet core 32. Outer pole piece 50 may be disposed radially outwardly of coil 34 and radially inwardly of pole ring 42 of magnet core 32. Outer pole piece 50 may include a plurality of grooves 56 or teeth that are adapted to engage a corresponding plurality of grooves 58 or teeth in an endless belt 60 by which rotor 36 is driven. Friction face 52 may include a plurality of radially-spaced concentric slots 62 that form a plurality of magnetic poles.

Armature assembly 38 is provided to transmit torque between rotor 36 and drive shaft 26 of compressor 22. An assembly 38 in accordance with a first embodiment of the present invention may include a hub 64, a resiliently flexible spider 66, an armature disc 68, a counterweight 70, and a connector 72.

Hub 64 provides a structural framework for armature assembly 38. Hub 64 is conventional in the art and may be made from powdered metal, steel or plastic. Hub 64 is annular and is centered about axis 28. Hub 64 is L-shaped in radial cross-section, having a plurality of radially-extending spokes or teeth 74. Referring to FIG. 2, hub 64 may also include a plurality of spline teeth 76, or keys, configured to be received within corresponding keyways (not shown) in shaft 26 to secure shaft 26 for rotation with hub 64. In a constructed embodiment, hub 64 includes twenty-three spline teeth 76 or keys. Referring to FIG. 1, hub 64 also includes an axially-extending locating pin 78 for a purpose to be described hereinbelow.

Spider 66 is provided to dampen acoustic noise and vibration while allowing axial movement of armature disc 68 for selective engagement with rotor 36. Spider 66 is made from a resiliently flexible material such as plastic and may be injection molded. Spider 66 includes a sleeve 80 that encircles spokes 74 of hub 64 and a web 82 that is integral with sleeve 80 and extends radially outwardly therefrom. Spider 66 is fixed against rotation relative to hub 64, but includes a living hinge 84 at the intersection of web 82 and sleeve 80 that allows web 82 to flex axially back and forth relative to sleeve 80 and hub 64. Spider 66 is annular in construction, having an aperture 86 centered about axis 28.

Armature disc 68 is provided for selective frictional engagement with friction face 52 of rotor 36 to selectively transmit torque from rotor 36 to drive shaft 26 of compressor 22. Disc 68 is conventional in the art and may be made from a material having a relatively low magnetic reluctance such as steel. Disc 68 is annular, may be disposed radially outwardly of hub 64, and may be connected to a first side 88 of spider 66 by one or more rivets 90 or other fastening means. Referring now to FIG. 2, disc 68 may include one or more radially-spaced concentric slots 92. Each of slots 92 may be further divided into a plurality of angularly-spaced slots. In the illustrated embodiment, however, only the radially outermost slot 92 is so divided. Slots 92 form a plurality of magnetic poles and, together with slots 62 of rotor 36, cause magnetic flux to weave back and forth between armature disc 68 and rotor 36 upon energization of coil 34.

Counterweight 70 is provided to balance the dynamic forces exerted on the components of coupling 20 by compressor 22. Counterweight 70 is also provided to restrain axial movement of armature disc 68 in the event spider 66 fails. Counterweight 70 may be made from a wide variety of materials including conventional metals and plastics and is formed from a thin sheet metal in a constructed embodiment. Referring now to FIG. 3, counterweight 70 may be substantially C-shaped or arch-shaped and is disposed on a second side 93 of spider 66. It should be understood, however, that counterweight 70 may assume a variety of shapes and sizes. Referring again to FIG. 1, a radially outer portion 94 of counterweight 70 is axially aligned with a radially inner portion 96 of armature disc 68 such that the radially outer portion 94 of counterweight 70 overlaps radially inner portion 96 of armature disc 68. As a result, if spider 66 fails, counterweight 70 will limit the axial movement of armature disc 68 in the direction away from rotor 36.

Connector 72 is provided to couple counterweight 70 to hub 64 of armature assembly 38 and shaft 26 of compressor 22. Connector 72 may be made from a wide variety of conventional metals or plastics and may be integral with counterweight 70. Referring to FIG. 3, connector 72 may include an annular portion 98 that is axially-spaced from counterweight 70 and a semicircular portion 100 that connects annular portion 98 and counterweight 70. Portion 98 may include an aperture 102 that is configured to receive shaft 26 or shank 30 of shaft 26. Referring again to FIG. 1, when shaft 26 or shank 30 is inserted through aperture 102, portion 98 of connector 72 may be recessed within aperture 86 of spider 66. Referring again to FIG. 3, portion 98 may also include an aperture 104 that is configured to receive locating pin 78 of hub 64 (best shown in FIG. 1). In this manner, counterweight 70 is connected for rotation with hub 64 and shaft 26 to balance out the dynamic forces exerted on the components of coupling 20 by compressor 22. The manner of connection also ensures that counterweight 70 will not affect hinge 84 of spider 66 because counterweight 70 is completely independent of spider 66.

Figure 5:
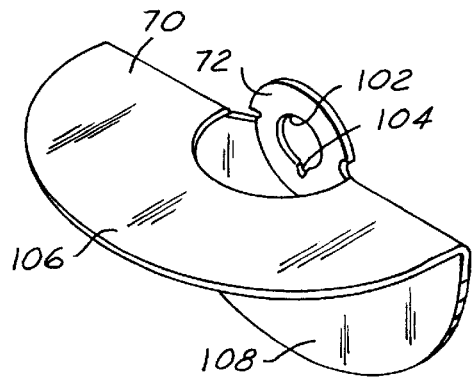
Figure 6:
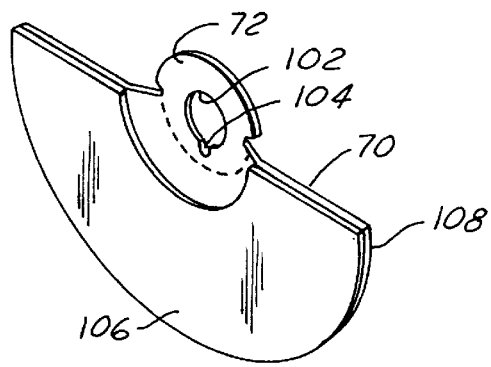

Referring now to FIGS. 1 and 4–6, a method for adding a counterweight 70 to a selectively engageable and disengageable electromagnetic coupling 20 is illustrated. The method may first include the step of providing counterweight 70 together with connector 72. As shown in FIG. 4, counterweight 70 may initially be annular in shape and connector 72 may be integral with counterweight 70 and include apertures 102, 104. Referring now to FIGS. 5 and 6, the method may also include the step of folding counterweight 70 so that a first portion 106 of counterweight 70 is axially adjacent a second portion 108 of counterweight 70. Referring now to FIG. 1, the method may further include the step of inserting one end of a drive shaft 26 or shank 30 that extends through coupling 20 through aperture 102 of connector 72. The method may also include the step of inserting a locating pin 78 extending from hub 64 of coupling 20 through aperture 104.

A method in accordance with the present invention provides several advantages. First, folding counterweight 70 enables the use of thinner sheet metal even when a thicker and/or heavier metal is desired for counterweight 70. Thin sheet metal is less expensive and is easier to work with as compared to thicker and/or heavier sheet metal. Second, folding counterweight 70 allows connector 72 to be made integrally with counterweight 70—thereby saving assembly time and reducing the number of components of coupling 20—without significantly affecting the weight of counterweight 70.

Figure 7:
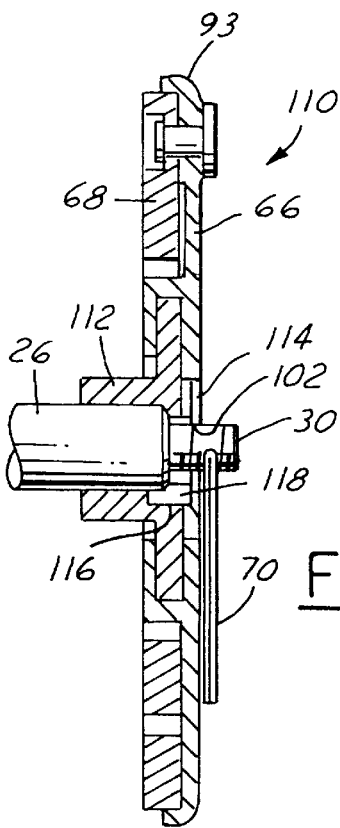
FIG. 7 is a cross-sectional view of an armature assembly in accordance with a second embodiment of the present invention.

Referring now to FIG. 7, an armature assembly 110 in accordance with a second embodiment of the present invention is illustrated. Armature assembly 110 includes a hub 112, spider 66, armature disc 68, counterweight 70, and a connector 114. Spider 66, armature disc 68, and counterweight 70 were all described hereinabove with reference to FIG. 1 and will not, therefore, be described again in any detail. Hub 112 is similar in construction and purpose to hub 64 described hereinabove with reference to FIG. 1. Hub 112 does not, however, including a locating pin. Rather, hub 112 includes an axially-extending keyway 116 for locating connector 114 and counterweight 70. Connector 114 is also similar in construction and purpose to connector 72 described hereinabove with reference to FIG. 1. Connector 114, however, does not include an aperture for receiving a locating pin. Rather, connector 114 includes an axially-extending key 118 configured to be received within keyway 116. Connector 114 may also include aperture 102 through which drive shaft 26 or shank 30 may be inserted.

Figure 8:
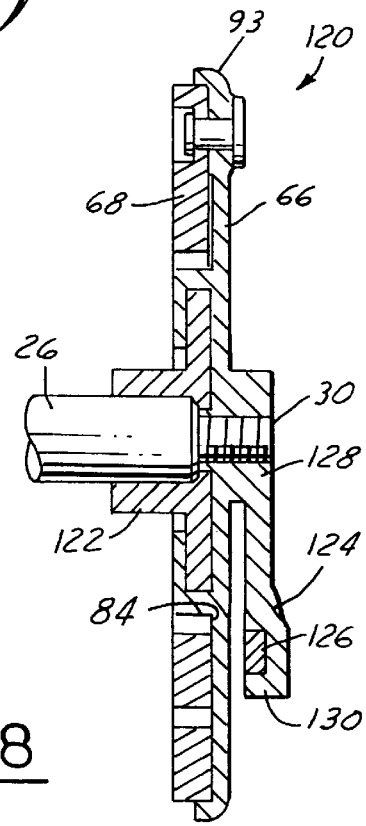
FIG. 8 is a cross-sectional view of an armature assembly in accordance with a third embodiment of the present invention.

Referring now to FIG. 8, an armature assembly 120 in accordance with a third embodiment of the present invention is illustrated. Armature assembly includes a hub 122, spider 66, armature disc 68, and a counterweight 124. Spider 66 and armature disc 68 were described hereinabove with reference to FIG. 1 and will not, therefore, be described again in any detail. Hub 122 is substantially similar in construction and purpose to hub 64 described hereinabove with reference to FIG. 1. Therefore, hub 122 will also not be described in any detail. It should be noted, however, that hub 122 differs from hub 64 because hub 122 does not include a locating pin.

Counterweight 124 of assembly 120 is provided to balance the dynamic forces exerted on the components of coupling 20 by a load such as compressor 22. Counterweight 124 may be made from a wide variety of materials, but is preferably made from plastic. A metal plug 126 may be encapsulated partially or fully within the plastic to increase the weight of counterweight 124. Counterweight 124 is connected to side 93 of spider 66 and may be integral with spider 66. Preferably, a radially inner portion 128 of counterweight 124 is connected to spider 66 while a radially outer portion 130 of counterweight 124 is axially spaced from spider 66. In this manner, hinge 84 of spider 66 will be able to flex substantially independent of counterweight 124. Inner portion 128 of counterweight 124 may be disposed about drive shaft 26 or shank 30 to further support counterweight 124.

Referring now to FIGS. 9–11, an armature assembly 132 in accordance with a fourth embodiment of the present invention is illustrated. Armature assembly 132 includes a hub 134, a spider 136, armature disc 68, and a counterweight 138. Armature disc 68 was described hereinabove with reference to FIG. 1 and will not, therefore, be described again in any detail. Hub 134 is substantially similar in construction and purpose to hub 64 described hereinabove with reference to FIG. 1. Therefore, hub 134 will also not be described in any detail. It should be noted, however, that hub 134 differs from hub 64 because hub 134 does not include a locating pin. Finally, spider 136 is also substantially similar in construction and purpose to spider 66 described hereinabove with reference to FIG. 1. Therefore, spider 136 will also not be described in any detail. Spider 136 differs from spider 66, however, in that spider 136 includes at least one slot 140 for a purpose to be described hereinbelow. In the illustrated embodiment, slot 140 is U-shaped and opens radially inwardly.

Counterweight 138 of assembly 132 is provided to balance the dynamic forces exerted on the components of coupling 20 by a load such as compressor 22. Counterweight 138 may be made from a wide variety of materials, but is preferably made from plastic. A metal plug 142 may be encapsulated partially or fully within the plastic to increase the weight of counterweight 138. Counterweight 138 is connected to side 143 of spider 136 and may be integral with spider 136. Referring to FIG. 10, when coupling 20 is not engaged (i.e., when armature disc 68 is not engaged with rotor 36), counterweight 138 is disposed in a plane $P_1$ and web 82 of spider 136 is disposed in a plane $P_2$ parallel to plane $P_1$. Referring now to FIG. 11, when coupling 20 is engaged (i.e., when armature disc 68 is engaged with rotor 36), web 82 flexes axially at hinge 84 and is displaced from plane $P_2$. Counterweight 138, however, remains in plane $P_1$ because slot 140 forms a hinge 144 that allows counterweight 138 to flex axially relative to spider 136. Referring again to FIG. 9—and as mentioned hereinabove—slot 140 is preferably U-shaped and opens radially inwardly. It will be understood, however, that slots 140 of other shapes and sizes may also be employed. Spider 136 may also include additional slots 140 for balance.

While the invention has been particularly shown and described with reference to the preferred embodiments thereof, it is well understood by those skilled in the art that various changes and modifications can be made in the invention without departing from the spirit and scope of the invention.

We claim:

1. An armature assembly for a selectively engageable and disengageable electromagnetic coupling, said armature assembly comprising:

a hub having a central axis;

a resiliently flexible spider disposed radially outwardly of said hub, said spider fixed against rotation relative to said hub and a radially outer portion of said spider axially movable relative to said hub;

an annular armature disc disposed radially outwardly of said hub and connected to a first side of said spider;

a counterweight disposed on a second side of said spider; and, a connector coupled to said counterweight wherein said connector includes an axially extending key configured to be received within an axially extending keyway in said hub.

2. An armature assembly for a selectively engageable and disengageable electromagnetic coupling, said armature assembly comprising:

a hub having a central axis;

a resiliently flexible spider disposed radially outwardly of said hub, said spider fixed against rotation relative to said hub and a radially outer portion of said spider axially movable relative to said hub;

an annular armature disc disposed radially outwardly of said hub and connected to a first side of said spider;

a counterweight disposed on a second side of said spider; and, a connector coupled to said counterweight wherein said connector is axially spaced from said counterweight.

3. An armature assembly for a selectively engageable and disengageable electromagnetic coupling, said armature assembly comprising:

a hub having a central axis;

a resiliently flexible spider disposed radially outwardly of said hub, said spider fixed against rotation relative to said hub and a radially outer portion of said spider axially movable relative to said hub;

an annular armature disc disposed radially outwardly of said hub and connected to a first side of said spider;

a counterweight disposed on a second side of said spider; and, a connector coupled to said counterweight wherein said connector is recessed within an aperture in said spider.

4. An armature assembly for a selectively engageable and disengageable electromagnetic coupling, said armature assembly comprising:

a hub having a central axis;

a resiliently flexible spider disposed radially outwardly of said hub, said spider fixed against rotation relative to said hub and a radially outer portion of said spider axially movable relative to said hub;

an annular armature disc disposed radially outwardly of said hub and connected to a first side of said spider; and, a counterweight disposed on a second side of said spider;

wherein said counterweight is connected to said spider and said spider includes a U-shaped slot disposed proximate said counterweight.

5. The armature assembly of claim 4 wherein said counterweight is made from a resiliently flexible plastic.

6. The armature assembly of claim 5 wherein said counterweight includes a metal plug supported within said plastic.

7. The armature assembly of claim 4 wherein said counterweight is integral with said spider.

8. The armature assembly of claim 4 wherein said slot opens radially inwardly.

9. An armature assembly for a selectively engageable and disengageable electromagnetic coupling, said armature assembly comprising:

a hub having a central axis;

a resiliently flexible spider having a sleeve portion and a web portion, said sleeve portion telescoped over said hub and captivated against rotational and axial movement relative to said hub, said web portion projecting radially outwardly from said sleeve portion and forming a living hinge therewith that permits said web portion to flex axially relative to said sleeve portion;

an annular armature disc disposed radially outwardly of said hub and disposed on a first side of said spider;

a counterweight disposed on a second side of said spider; and, a connector connected to said counterweight and recessed within a first aperture in said spider.

10. The armature assembly of claim 9 wherein said connector includes a second aperture configured to receive a shaft extending through said hub.

11. The armature assembly of claim 9 wherein said connector includes a second aperture configured to receive a locating pin extending from said hub.

12. The armature assembly of claim 9 wherein said connector includes an axially extending key configured to be received within an axially extending keyway in said hub.

13. The armature assembly of claim 9 wherein the distance from the central axis to the radially outer portion of the counterweight is larger than the distance from the central axis to the radially inner portion of the armature disc.

* * * * *